April 13, 1937.  J. E. LILIENFELD  2,076,905
ELECTRICAL CONDENSER
Filed Sept. 24, 1931
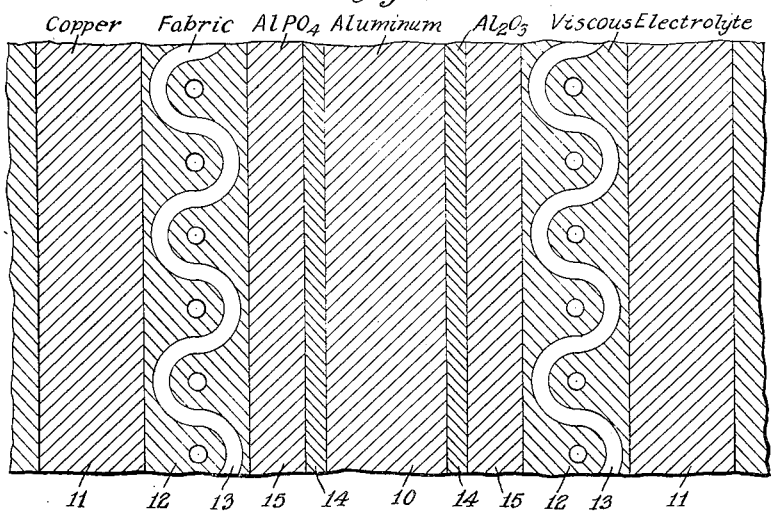
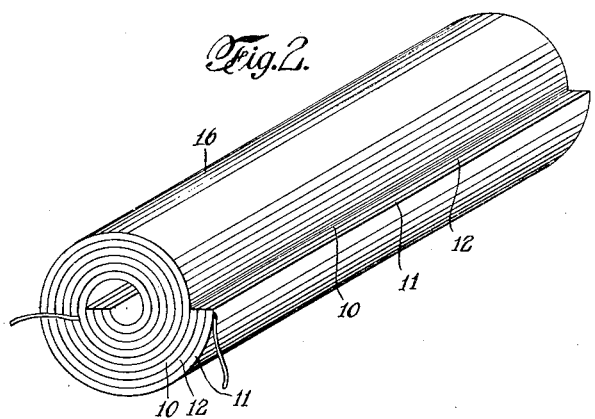
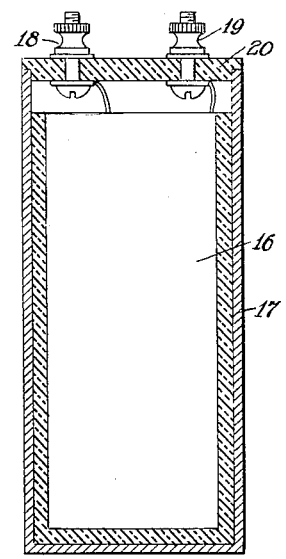
INVENTOR
JULIUS EDGAR LILIENFELD
BY
ATTORNEY Patented Apr. 13, 1937

2,076,905

UNITED STATES PATENT OFFICE 2,076,905

ELECTRICAL CONDENSER

Julius Edgar Lilienfeld, Winchester, Mass., assignor, by mesne assignments, to The Magnavox Company, Fort Wayne, Ind., a corporation of Arizona Application September 24, 1931, Serial No. 564,785

7 Claims. (Cl. 175—315)

The invention relates to electrical condensers, more especially of the electrolytic type, the electrodes being separated by a highly viscous electrolyte and coiled or formed into a roll.

In condensers of this nature, the active film of the anode is frequently mechanically injured in the winding or rolling up operation, which results in a larger number of rejections, and reduces materially the efficiency of the finished condenser and also its life.

It is an object of the present invention to construct a condenser of this type in such a manner that the danger of any mechanical injury to the active layer is greatly reduced if not entirely obviated, more especially in the provision of an overlying protective inactive layer.

A further object of the invention resides in the provision of a novel electrolyte of a highly viscous or more or less pasty nature which will further serve to protect the active film.

The present invention is a continuation in part of my prior applications, Serial No. 560,140 and No. 560,141, filed August 29, 1931.

The nature of the invention, however, will best be understood when described in connection with the accompanying drawing, in which:

Fig. 1 is a fragmentary transverse section, on a greatly exaggerated and disproportionate scale, through a number of electrodes and separating electolyte.

Fig. 2 is a perspective view of a condenser roll.

Fig. 3 is vertical section, partly in elevation, of the roll encased in a suitable housing member for the same.

Referring to the drawing, 10 designates an anode and 11 a cathode of a series of alternately spaced electrodes separated by a highly viscous electrolyte 12 and with interposed retiform insulating material 13, such as cambric, permeated by the said electrolyte. In addition to a novel electrolyte, the anodes 10 are of a novel nature, more especially with reference to the coating applied thereover. Heretofore, but a single coating, for example in the case of aluminum anodes, the oxide or coating formed in boric acid, was provided over the surface of the filming metal constituting the anode to afford the active film or dielectric. This film is of a mechanically immeasurable thickness and is particularly vulnerable so that in the rolling or winding-up operation of the condenser it is frequently injured, and on occasions to such an extent that the condenser is rendered practically useless.

In the preparation of this anode, furthermore, the forming of the same is to be effected prior to the assembly of the condenser electrodes, the viscous electrolyte being utilized merely to separate the electrodes and to afford the electrolyte for operation of the condenser.

In accordance with the invention and as more particularly set forth in my aforesaid copending application Serial No. 560,141, the coating applied to the anode is of a bilaminate nature molecularly associated with the anode metal and of which the proximate layer 14 constitutes the active and dielectric film, while the outer or overlying layer 15 is inactive, of mechanically measurable thickness, and permeable to OH ions in the presence of water or aqueous vapor.

This heavier overlying layer 15 affords thus a substantial protective coating over the underlying layer of minute thickness to adequately protect the same in the rolling up of the condenser elements. Moreover, it makes for advantages, electrically, e. g. higher breakdown voltage, the possibility of reducing power loss in the admixture of a conducting filler to the electrolyte, and as is more fully set forth in my aforesaid copending application, Serial No. 560,141.

The metal utilized for the anode is, of course, to be of a filming nature such as aluminum, tantalum, etc., and the film 14 may be the oxide thereof, as obtained by forming the anode in boric acid, while the overlying film 15 may be the phosphate as obtained by forming in phosphoric acid. These films are applied in the manner more particularly set forth in my said copending application, Serial No. 560,141, and are irreversible as to their order of application.

Furthermore, the nature of the electrolyte, being a forming one, is such as to also enhance the protective feature, as well as affording a substantial separating medium. It is of a highly viscous nature and preferably of a conducting mass constituted, for example, by a condensation product of an alcohol and an acid such as is more particularly set forth in my aforesaid copending application, Serial No. 560,140. As set forth, this electrolyte comprises a glycol (triethylene glycol), or compounds thereof, with a weak mineral or organic acid, such as boric acid, the polymerization being effected preferably in the presence of a catalyst, such as zinc chloride. In order to render this electrolyte plastic and give a very firm body thereto, there may be suspended therein a suitable filler material such as a conducting dust (aluminum and copper dust, etc., or finely divided sub-divided carbon as lamp black and activated charcoal), or an insulating dust such as diatomaceous earth, regenerated or not regenerated cellulose dust, as well as a mixture of a conducting filler with an insulating filler.

The separated electrodes are rolled or coiled in well-known manner to form a roll 16, as indicated in Fig. 2 of the drawing; and, if desired, the roll may be housed within a suitable casing 17, leads being brought out from the respective electrodes to corresponding terminals 18 and 19 on the cover 20 of the casing.

I claim:

1. An electrical condenser, comprising alternate electrodes separated by a highly viscous electrolyte and retiform material, the anodic electrode being preformed and having a bilaminate integral coating molecularly associated therewith and the proximate layer constituting the active and dielectric film and the overlying layer being inactive and permeable to OH ions in the presence of water or aqueous vapor, the whole being in coiled form.

2. An electrical condenser, comprising alternate electrodes separated by a highly viscous electrolyte and retiform material, the anodic electrode being preformed and having a bilaminate integral coating molecularly associated therewith and the proximate layer constituting the active and dielectric film and the overlying layer being inactive and permeable to OH ions in the presence of water or aqueous vapor, the whole being coiled into a roll, and a casing for the roll provided with suitable terminals connected to the respective electrodes.

3. An electrical condenser, comprising alternate electrodes separated by a highly viscous electrolyte consisting of a reaction product of a glycol and boric acid and retiform material, the anodic electrode being of preformed aluminum and having a bilaminate integral coating molecularly associated therewith, and the proximate layer being an oxide of aluminum and the overlying layer a phosphate thereof, the whole being in coiled form.

4. An electrical condenser, comprising alternate electrodes separated by a highly viscous electrolyte and interposed retiform insulating material permeated by the said electrolyte, the anodic electrode being preformed and having a bilaminate integral coating molecularly associated therewith and the proximate layer constituting the active and dielectric film and the overlying layer being inactive and permeable to OH ions in the presence of water or aqueous vapor, the whole being in coiled form.

5. An electrical condenser, comprising alternate electrodes separated by a retiform material and a highly viscous electrolyte comprising a reaction product of a glycol with boric acid, the anodic electrode being preformed and having a bilaminate integral coating molecularly associated therewith and the proximate layer constituting the active and dielectric film and the overlying layer being inactive and permeable to OH ions in the presence of water or aqueous vapor, the whole being in coiled form.

6. An electrical condenser, comprising alternate electrodes separated by a retiform material and a highly viscous electrolyte comprising a condensation product of an alcohol and an acid and mixed with a filler, the anodic electrode being preformed and having a bilaminate integral coating molecularly associated therewith and the proximate layer constituting the active and dielectric film and the overlying layer being inactive and permeable to OH ions in the presence of water or aqueous vapor, the whole being in coiled form.

7. An electrical condenser, comprising alternate electrodes separated by a retiform material and a highly viscous electrolyte comprising a reaction product of a glycol with boric acid and mixed with a filler, the anodic electrode being of preformed aluminum and having a bilaminate integral coating molecularly associated therewith and the proximate layer being an oxide of aluminum and the overlying layer a phosphate thereof, the whole being in coiled form.

JULIUS EDGAR LILIENFELD.